Patented Apr. 15, 1930

1,754,243

UNITED STATES PATENT OFFICE

TEIKICHI SATOW, OF TOKYO, JAPAN

LACQUER COMPOSITION

No Drawing.   Application filed January 23, 1926.   Serial No. 83,204.

This invention relates to an improved lacquer composition or vulcanized lacquer, and is based upon my discovery that certain treatment of the milk extract or juice of the lacquer plant, which is a viscid liquid and very poisonous to the human skin, will completely change the composition and effect so as to lose its poisonous qualities and become useful as a protective coating for metals, wood, fibre and the like. It is also valuable as a filler, as a carrier, as an adhesive for veneering and the like; as a high quality insulation material for electricity; as a good heat resisting material; as a good protective against strong alkalies and concentrated acids; and for other purposes.

The raw material, or lacquer-milk, is obtained from the so-called lacquer plant or Japanese varnish tree, *Rus vernicifera*, a member of the Cashew family, which grows abundantly in Japan, in China, in Cochin-China, in the Malay Islands and neighboring tropical regions. I have discovered that when the plant juice or lacquer-milk of the above-named plant is heated with sulphur in proper proportions and under suited conditions, the poisonous properties of the raw material are lost, and the plant juice changes from a milky substance to a thick mass which is semi-fluid at about 100° C., and becomes semi-solid at room temperature.

My investigations of the constituents contained in the juice of the Japanese lacquer plant lead to the conclusion that one of its principal constituents is urusiol, in the form of two double bonded molecules, with which surphur combines only slowly. I have found that the best results are obtained when 100 parts by weight of the raw lacquer juice is heated with 40 to 60 parts of sulphur, at temperatures between 120° C. to 160° C. which is maintained for from one to three hours. The heating of these materials, to bring about the reaction and to produce the new and changed product, is carried out at atmospheric pressures, thereby greatly facilitating the process. The material thus obtained I will call vulcanized lacquer, which possesses exceptionally good insulation properties, and which serves as a base with other chemical and physical combinations to form what is herein known as a lacquer composition. The lacquer composition herein obtained may be used in various ways as follows:

(A) As an induration product. This is best obtained by heating 100 parts by weight of the vulcanized lacquer with 10 to 30 parts of an aldehyde, as formic- or acetic-aldehyde and the like, for twenty to thirty minutes at atmospheric pressure whereby a rapidly hardening material is obtained, which is useful as an induration material, to form insulation products and the like, with suitable fillers. This material is also valuable as an impregnation product, where the lacquer composition is used as an impregnation material for fibrous materials, wood, or clay, and organic composition bases.

(B) As coating material, preferably in the form of a liquid insulation coating, but which is excellent as a filler carrier, or as an adhesive agent. This material is best obtained by dissolving either the vulcanized lacquer or the induration product in a suitable solvent, such as benzine, benzol, acetone, and the like. This dissolved, vulcanized lacquer, (or the dissolved induration product) may then be applied as coating for surfaces to be heat insulated, or electrically insulated, or to be protected from chemicals as alkalies or acids, or to serve as an insulating glue for veneering, for paper, wood, cloth and the like, or as a filler carrier or base compound for mixing with it sawdust, wood-flour, asbestos, pulverized clay and the like.

I have also discovered that when the induration product described above is mixed with a phenolic resin, a product is produced having greatly increased electric insulation qualities. If, on the other hand, I mix with the said induration product, 10 to 30 parts of rubber, I obtain a product having better elastic properties than was possessed by the original product, and this product also possesses excellent heat resistance, sufficient to prevent charring at a temperature of about 360° C. In some instances I prefer to add to the induration product both the phenolic resin and the rubber to obtain a more or less elastic product of great heat resisting properties.

While I have given specific examples to illustrate applications of my invention in a practical way, I do not thereby desire to be understood as having thus limited myself unduly. What I claim, therefore, as new and useful, of my own invention, and desire to secure by Letters Patent is:

1. A lacquer material comprising a reaction product of urusiol and sulphur.

2. A lacquer composition comprising a reaction product of urusiol and sulphur in combination with an aldehyde.

3. A coating composition comprising the reaction product of urusiol and sulphur, and a fibrous filler material.

4. A coating composition comprising the reaction product of urusiol and sulphur in combination with an aldehyde and a fibrous filler material.

5. A coating composition comprising the product obtained by heating together urusiol and sulphur and said product brought in combination with an aldehyde, a fibrous material and an inorganic filler.

6. A coating material derived from heating to a reaction temperature urusiol and sulphur to form a vulcanized lacquer and dissolving said lacquer in a solvent.

7. A product of manufacture comprising a fibrous material in combination with the reaction product of urusiol and sulphur.

8. The method of preparing a composition from a milky liquid plant product containing urusiol which comprises heating said plant product with sulphur at atmospheric pressures until said milky product changes to a thick mass which is a semi-liquid at about 100° C.

9. The method of preparing a composition from a milky liquid plant product containing urusiol which comprises heating said plant product with sulphur at atmospheric pressures until said milky product changes to a thick mass which is a semi-liquid at about 100° C. to form a vulcanized lacquer product, then adding to said lacquer product a base product, and causing said product to combine therewith.

In testimony whereof I have hereunto set my hand on this 7th day of January A. D., 1926.

TEIKICHI SATOW.